United States Patent
Xiao et al.

(10) Patent No.: US 10,345,676 B2
(45) Date of Patent: Jul. 9, 2019

(54) HEAD MOUNTED DISPLAY DEVICE AND IMAGE PROJECTION METHOD

(71) Applicant: HTC CORPORATION, Taoyuan (TW)

(72) Inventors: Bo-Wen Xiao, Taoyuan (TW); Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/869,035

(22) Filed: Jan. 12, 2018

(65) Prior Publication Data

US 2018/0259826 A1 Sep. 13, 2018

Related U.S. Application Data

(60) Provisional application No. 62/470,357, filed on Mar. 13, 2017.

(51) Int. Cl.
*G02F 1/29* (2006.01)
*G02B 27/01* (2006.01)

(52) U.S. Cl.
CPC .......... *G02F 1/29* (2013.01); *G02B 27/0172* (2013.01); *G02B 27/0179* (2013.01); *G02B 2027/0123* (2013.01); *G02B 2027/0181* (2013.01); *G02B 2027/0187* (2013.01)

(58) Field of Classification Search
CPC ...... G02F 1/29; G02F 1/292; G02F 2001/291; B82Y 20/00; G02B 26/005
USPC ....................................................... 359/315
See application file for complete search history.

(56) References Cited

U.S. PATENT DOCUMENTS

| 5,715,337 A | * | 2/1998 | Spitzer | G02B 27/017 |
| | | | | 359/223.1 |
| 9,454,010 B1 | | 9/2016 | Passmore et al. | |
| 2012/0069046 A1 | | 3/2012 | Rapoport et al. | |
| 2013/0335671 A1 | * | 12/2013 | Fleck | G02B 27/017 |
| | | | | 349/62 |

(Continued)

FOREIGN PATENT DOCUMENTS

| CN | 104246578 | 12/2016 |
| WO | 2016046514 | 3/2016 |

OTHER PUBLICATIONS

"Search Report of Europe Counterpart Application", dated Aug. 21, 2018, p. 1-p. 15.

(Continued)

*Primary Examiner* — Mohammed A Hasan
(74) *Attorney, Agent, or Firm* — JCIPRNET (57) ABSTRACT

A head mounted display (HMD) device and an image projection method are provided. The head mounted display device includes an optical waveguide device, an image device, an optical conversion layer and a processor. The optical waveguide device receives an image light beam and projects a projection image through a surface. The image device is used to provide the image light beam. The optical conversion layer is disposed overlapping the edge of the surface of the optical waveguide device. The optical conversion layer deflects a portion of the projection image to generate an adjusted projection image according to a command signal, so that the adjusted projection image is transmitted to a projection target. The processor generates the command signal according to a position of the projection target.

14 Claims, 7 Drawing Sheets

(56) References Cited

U.S. PATENT DOCUMENTS

2016/0195720 A1* 7/2016 Travis ................. G03H 1/0248
345/8

OTHER PUBLICATIONS

"Search Report of Europe Counterpart Application", dated Dec. 13, 2018, p. 1-p. 6.
"Office Action of Taiwan Counterpart Application", dated Nov. 23, 2018, p. 1-p. 6.

* cited by examiner

HEAD MOUNTED DISPLAY DEVICE AND IMAGE PROJECTION METHOD

CROSS-REFERENCE TO RELATED APPLICATION

This application claims the priority benefit of U.S. provisional application Ser. No. 62/470,357, filed on Mar. 13, 2017. The entirety of the above-mentioned patent application is hereby incorporated by reference herein and made a part of this specification.

BACKGROUND OF THE INVENTION

Field of the Invention

The invention relates to a display device and an image projection method, and more particularly, to a head mounted display device and an image projection method.

Description of Related Art

With the rapid development of electronic products, display effects of virtual reality (VR) and augmented reality (AR) has become a new generation of display devices to pursue the goal for providing high-quality video and audio display interfaces, in which a head mounted display (HMD) device is a display device used to implement this technology.

In many designs of the conventional augmented reality-head mounted display (AR-HMD) device, the generated augmented reality images are too small in terms of a viewing angle which fails to provide a realistic and immersive sensation for users. Therefore, how to allow the head-mounted display device to have the wider viewing angle is actually the focus of attention of the persons skilled in the art.

SUMMARY OF THE INVENTION

The invention is directed to a head mounted display device and an image projection method thereof, which are capable of increasing the viewing angle.

The head mounted display device of the invention includes an optical waveguide device, an image device, an optical conversion layer and a processor. The optical waveguide device receives an image light beam and projects a projection image through a surface. The image device is used to provide the image light beam. The optical conversion layer is disposed overlapping the edge of the surface of the optical waveguide device. The optical conversion layer deflects a portion of the projection image to generate an adjusted projection image according to a command signal, so that the adjusted projection image is transmitted to a projection target. The processor is coupled to the optical conversion layer, and generates the command signal according to a position of the projection target.

The image projection method of the invention includes the following steps. The optical waveguide device is provided to receive an image light beam, and project a projection image through a surface. A command signal is generated according to a position of the projection target. An optical conversion layer is configured to be disposed overlapping an edge of the surface of the optical waveguide device, and a portion of the projection image is deflected to generate an adjusted projection image by the optical conversion layer according to a command signal, so that the adjusted projection image is transmitted to the projection target.

Based on the above, according to the head mounted display device and the image projection method described in the embodiments of the invention, the portion of the projection image—which cannot be transmitted to the projection target E1 originally—is deflected to generate the adjusted projection image, and the adjusted projection image is transmitted to the projection target so that the purpose of increasing the viewing angle of the head mounted display device can be achieved.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the present disclosure, examples of which are illustrated in the accompanying drawings. Wherever possible, the same reference numbers are used in the drawings and the description to refer to the same or like parts.

Figure 1:
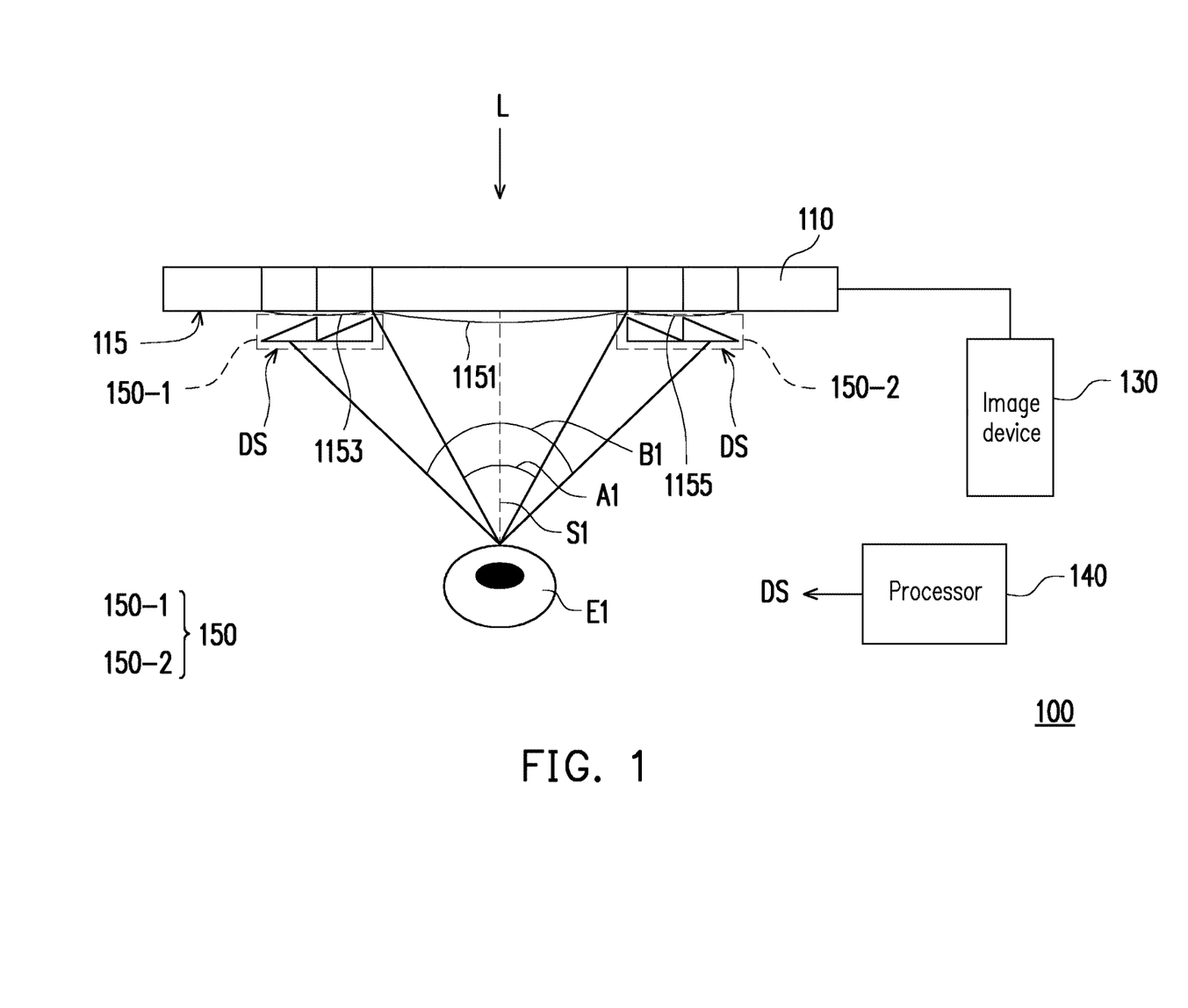
FIG. 1 is a schematic diagram illustrating a head mounted display device in an embodiment of the invention.

With reference to FIG. 1, FIG. 1 is a schematic diagram illustrating a head mounted display device in an embodiment of the invention. A head mounted display device 100 includes an optical waveguide device 110, an image device 130 and an optical conversion layer 150. The image device 130 is used to provide an image light beam (not shown). The optical waveguide device 110 receives the image light beam and projects a projection image (not shown) through a surface 115. The optical conversion layer 150 is disposed overlapping an edge of the surface 115, wherein a conversion layer 150-1 is a portion of the optical conversion layer 150 located on an edge 1153 of the surface 115, and a conversion layer 150-2 is a portion of the optical conversion layer 150 located on an edge 1155 of the surface 115. A processor 140 is coupled to the optical conversion layer 150, and generates a command signal DS according to a position of a projection target E1. The optical conversion layer 150 deflects a portion of the projection image to generate an adjusted projection image (not shown) according to a command signal DS, so that the adjusted projection image is transmitted to the projection target E1. In the present embodiment, with the configuration of the optical conversion layer 150, a portion to be projected by the edge of the surface 115 in the projection image projected by the surface 115 of the optical waveguide device 110 is deflected towards the projection target E1 so as to increase a viewing angle of the head mounted display device 100.

In detail, after entering the optical waveguide device 110, the image light beam provided by the image device 130 is transmitted by the optical waveguide device 110 so that the projection image is projected by the surface 115. The projection image may include a near-eye projection image (not shown) close to the projection target E1 and an edge projection image (not shown) away from the projection target E1. The near-eye projection image is a portion of the projection image projected by a near-eye zone 1151 of the surface 115, and the edge projection image is a portion projected by the edges 1153 and 1155 of the surface 115. In the present embodiment, the projection target E1 may be, for example, an eyeball of a user, and a visual line of the projection target E1 for viewing the head mounted display device 100 is a visual line S1.

When the optical conversion layer 150 is inactive, due to limitation of the optical conversion layer 110 on transmitting the image light beam, only the near-eye projection image projected by the near-eye zone 1151 can be transmitted to the projection target E1, whereas the edge projection image projected by the edges 1153 and 1155 cannot be transmitted to the projection target E1. In this case, a viewing angle of the projection target E1 for viewing the head mounted display device 100 is a viewing angle A1.

When the optical conversion layer 150 is active, the conversion layers 150-1 and 150-2 of the optical conversion layer 150 deflect the edge projection image towards the projection target E1 so that the edge projection image projected by the edges 1153 and 1155 can be transmitted to the projection target E1, making the viewing angle of the projection target E1 for viewing the head mounted display device 100 increased from the viewing angle A1 to a viewing angle B1. Accordingly, with the optical conversion layer 150 in the active state according to the present embodiment, the edge projection image—which cannot be transmitted to the projection target E1 originally—can be deflected towards the projection target E1 and transmitted to the projection target E1, so as to achieve the purpose of increasing the viewing angle of the head mounted display device 100.

In addition, an angle of the portion of the projection image deflected towards the projection target E1 by the optical conversion layer 150 is, for example, between 0° and 10°. In comparison, for the conventional head mounted display device, the viewing angle is approximately 40°. With the configuration of the optical conversion layer 150 in the present embodiment, the edge projection image deflected towards the projection target E1 can increase the viewing angle of the head mounted display device 100 by 60° or more. Such implementation result is merely a descriptive example instead a limitation to the invention.

It is noted that, after entering the optical waveguide device 110, an environment light L can penetrate the optical waveguide device 150 to be transmitted to the projection target E1. In this way, both the projection image for displaying and the environment light L can enter the projection target E1 so that the head mounted display device 100 can achieve the display effect of augmented reality.

For instance, the image device 130 of the present embodiment may include, for example, a micro liquid crystal display panel (LCD panel), a liquid crystal on silicon (LCOS) micro display or micro displays of other types, which are not particularly limited by the invention. In addition, the optical waveguide device 110 may be, for example, a scattering waveguide element, a holographic waveguide element, a polarizing waveguide element or a reflective waveguide element. Moreover, as along as the image light beam may be transmitted by the optical waveguide device 110 so that the projection image is projected towards the projection target E1, the method for transmitting the image light beam into the optical waveguide device 110 by the image device 130 is not particularly limited by the invention. A material of the optical waveguide device 110 may be, for example, at least one of glass or plastic, but the invention is not limited thereto. The optical waveguide device 110 may also be other suitable transparent substances. The processor 140 may be, for example, a processing circuit, and the processing circuit may include a controller and related circuits.

Figure 2:
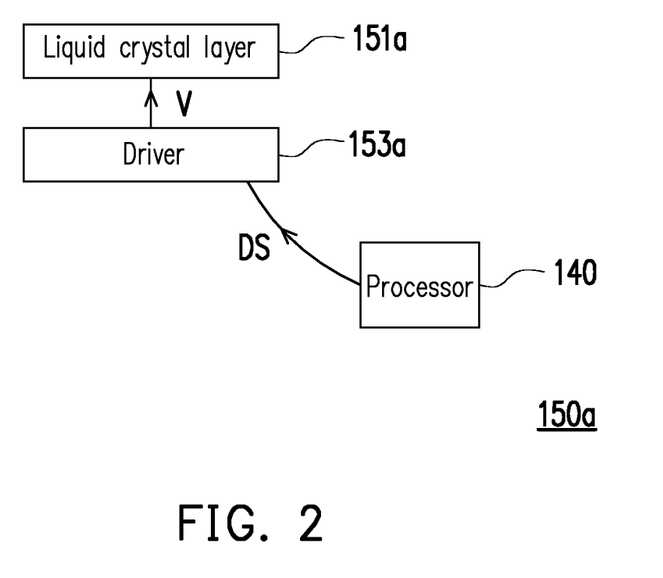
FIG. 2 is a schematic diagram illustrating an implementation of an optical conversion layer in an embodiment of the invention.

With reference to FIG. 2, FIG. 2 is a schematic diagram illustrating an implementation of an optical conversion layer in an embodiment of the invention. An optical conversion layer 150a shown by FIG. 2 is an implementation of the optical conversion layer of the head mounted display device 100 in the embodiment shown by FIG. 1. The optical conversion layer 150a includes a liquid crystal layer 151a and a driver 153a. The liquid crystal layer 151a is disposed overlapping the edges 1153 and 1155 of the surface 115 of the optical conversion layer 110. The driver 153a is coupled to the liquid crystal layer 151a, and provides a driving voltage V according to the command signal DS to adjust the liquid crystal layer 151a. Accordingly, the processor 140 can control the liquid crystal layer 151a so the portion of the projection image is reflected by the liquid crystal layer 151a to be deflected towards the projection target E1. As such, the edge projection image projected by the edges 1153 and/or 1155 of the surface 115 is deflected towards the projection target E1 and transmitted to the projection target E1 so that the purpose of increasing the viewing angle of the head mounted display device 100 may be achieved. The optical conversion layer 150a shown by FIG. 2 is merely descriptive example instead a limitation to the invention.

Figure 3:
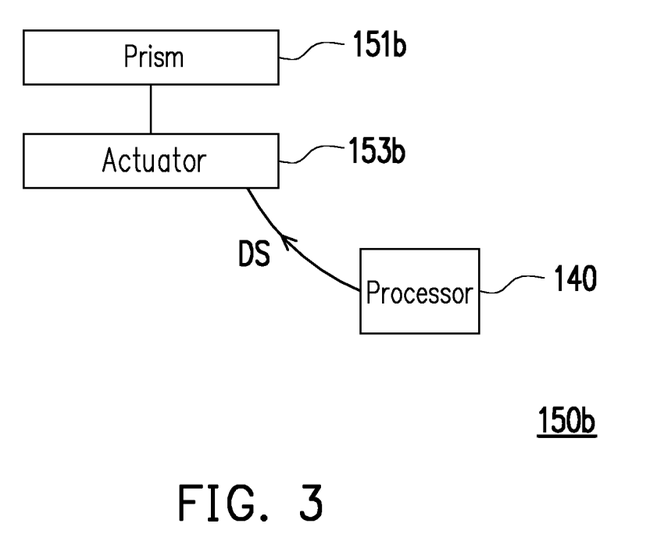
FIG. 3 is a schematic diagram illustrating another implementation of an optical conversion layer in an embodiment of the invention.

With reference to FIG. 3, FIG. 3 is a schematic diagram illustrating another implementation of an optical conversion layer in an embodiment of the invention. An optical conversion layer 150b shown by FIG. 3 is an implementation of the optical conversion layer of the head mounted display device 100 in the embodiment shown by FIG. 1. The optical conversion layer 150b includes at least one prism 151b and an actuator 153b. The at least one prism 151b is disposed overlapping the edges 1153 and/or 1155 of the surface 115 of the optical conversion layer 110. The actuator 153b is coupled to the at least one prism 151b and receives the command signal DS. The actuator 153b adjusts a rotation angle of the prism 151b according to the command signal DS so that the portion of the projection image is reflected by the prism 151b to be deflected towards the projection target E1. Accordingly, the processor 140 can control the optical conversion layer 150b to deflect the edge projection image projected by the edges 1153 and/or 1155 of the surface 115 towards the projection target E1 to be transmitted to the projection target E1 so that the purpose of increasing the viewing angle of the head mounted display device 100 may be achieved. Here, the number of the prisms 151b included by the optical conversion layer 150b is not limited by the invention, and the actuator 153b of the optical conversion layer 150b may be implemented by, for example, a micro-electro-mechanical system (MEMS) device. The optical conversion layer 150b shown by FIG. 3 is merely descriptive example instead a limitation to the invention.

Figure 4:
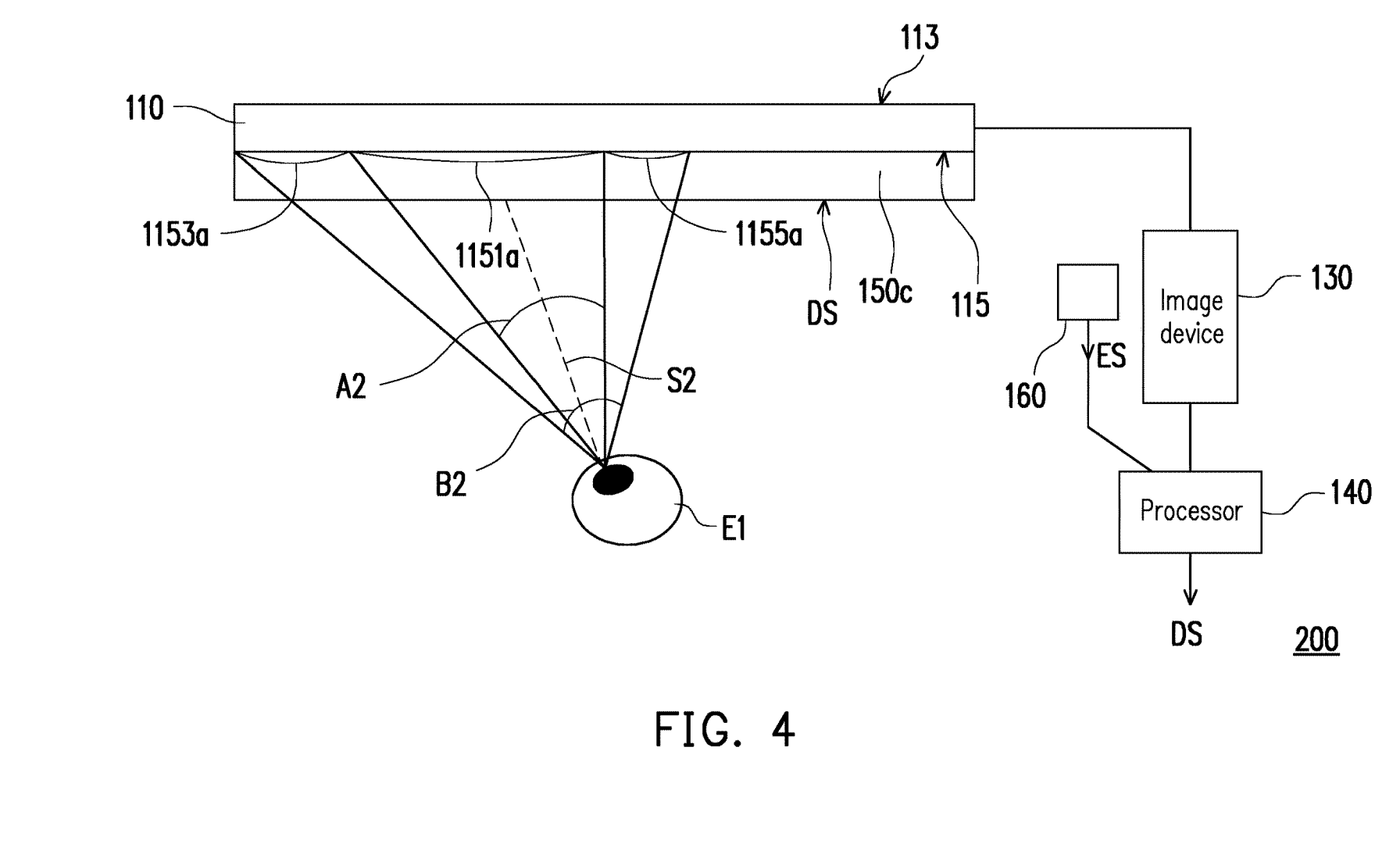
FIG. 4 is a schematic diagram illustrating a head mounted display device in another embodiment of the invention.

With reference to FIG. 4, FIG. 4 is a schematic diagram illustrating a head mounted display device in another embodiment of the invention. A head mounted display device 200 of the present embodiment and the head mounted display device 100 in the embodiment shown by FIG. 1 have similar structures and have identical functions and effects. A difference between the present embodiment and the embodiment shown by FIG. 1 is that, the head mounted display device 200 further includes a projection target detector 160, and the projection target detector 160 is coupled to the processor 140. The projection target detector 160 is used to generate a detection result ES by detecting the position of the projection target E1. The processor 140 receives the detection result ES to generate the command signal DS.

Specifically, the projection target E1 is, for example, the eyeball of the user, and the projection target detector 160 may be, for example, an eyeball visual line detector. In the present embodiment, a visual line S2 is taken as an example of a visual line of the projection target E1 for viewing the head mounted display device 200. The projection image projected by the surface 115 of the optical waveguide device 110 includes a near-eye projection image (now shown) close to the visual line S2 and an edge projection image (now shown) away from the visual line S2. The near-eye projection image is a portion of the projection image projected by a near-eye zone 1151a of the surface 115, and the edge projection image is a portion of the projection image projected by edges 1153a and 1155a of the surface 115. The near-eye projection image penetrates an optical conversion layer 150c to be transmitted to the projection target E1, and a viewing angle of the projection target E1 for viewing the near-eye projection image is a viewing angle A2. The processor 140 controls the optical conversion layer 150c according to the detection result ES so as to deflect the edge projection image towards the projection target E1. Accordingly, with the position of the projection target E1 detected through the projection target detector 160, the processor 140 can achieve the purpose of increasing the viewing angle simply by controlling whether to deflect or not to deflect the portion of the projection image in the optical conversion layer 150c located within a viewing angle B2. By doing so, a range to be driven by the optical conversion layer 150c may be reduced while reducing the required driving voltage and driving time. The optical conversion layer 150c may be realized by the optical conversion layer 150a shown by FIG. 2 or the optical conversion layer 150b shown by FIG. 3, and an operating principle regarding the same is not repeated hereinafter.

Figure 5:
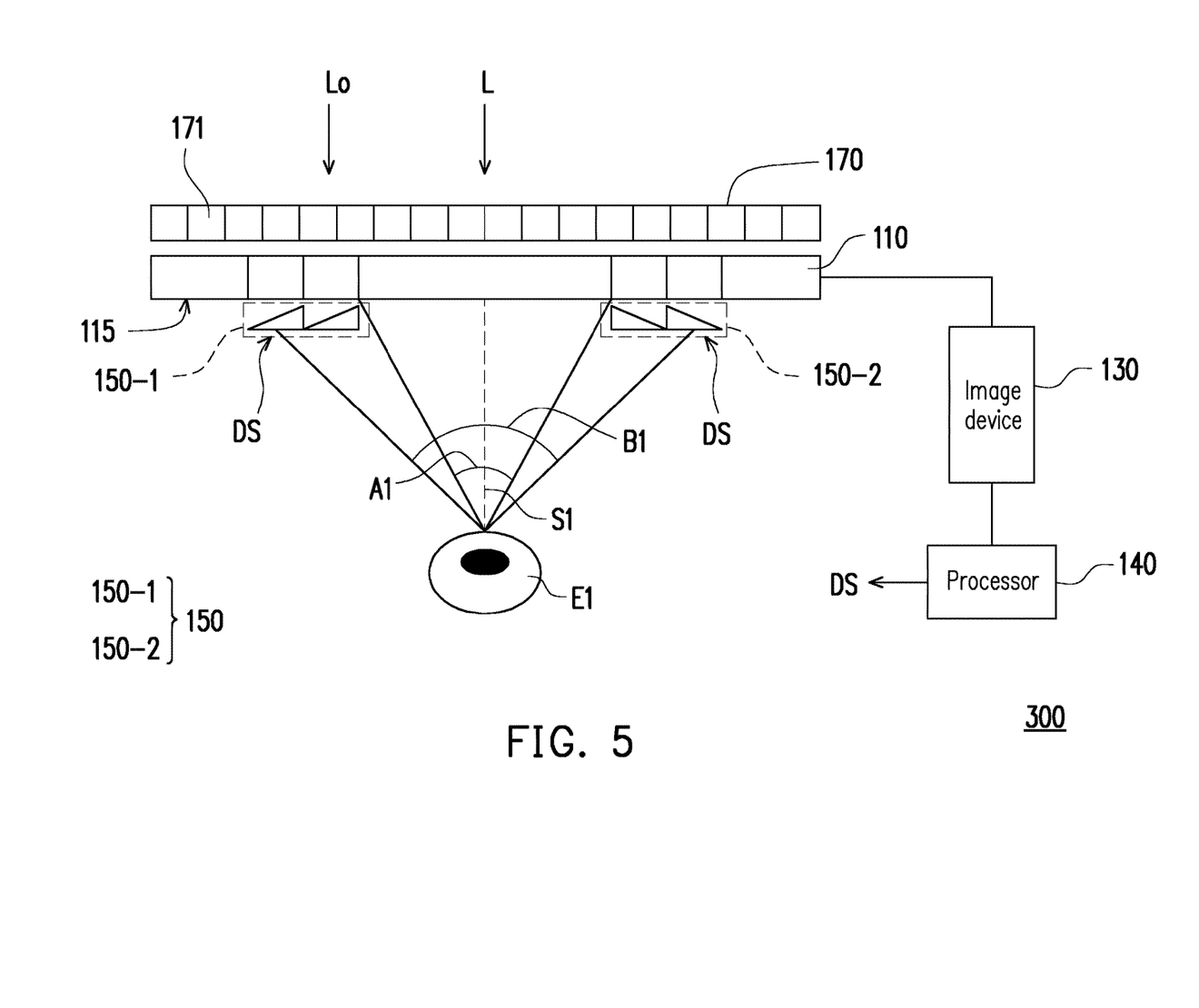
FIG. 5 is a schematic diagram illustrating a head mounted display device in yet another embodiment of the invention.

With reference to FIG. 5, FIG. 5 is a schematic diagram illustrating a head mounted display device in yet another embodiment of the invention. A head mounted display device 300 of the present embodiment and the head mounted display device 100 in the embodiment shown by FIG. 1 have similar structures and have identical functions and effects. A difference between the present embodiment and the embodiment shown by FIG. 1 is that, the head mounted display device 300 further includes an optical masking layer 170, and the optical masking layer 170 is located on a transmission path of the environment light L. The optical masking layer 170 includes a plurality of light masking members 171. The processor 140 controls the optical masking layer 170 so that a portion of the environment light L entering the optical waveguide device 110 is blocked by a part of the light masking members 171. In this way, the optical masking layer 170 can block the environment light L in response to requirements in augmented reality applications. For example, when the head mounted display device 300 executes a specific augmented reality application, it may not be desirable for an object in certain environments to appear in the augmented reality. In this case, the processor 140 can control the optical masking layer 170 to block the light ray of said object in the environment light L, so that it is not seen by the user.

In addition, the processor 140 may also control the optical masking layer 170 to block the environment light L according to the image light beam provided by the image device 130. In this way, the processor 140 can control the optical masking layer 170 to block a portion of the environment light L corresponding to the projection image, so as to increase a contrast when viewing the projection image, reduce influences of the environment light L to the projection image, and improve a display quality of the head mounted display device 300.

Specifically, each of the light masking members 171 of the optical masking layer 170 may include, for example, a liquid crystal layer (not shown). The processor 140 controls the liquid crystal layer to block the portion of the environment light L passing the light masking members 171 so as to reduce the environment light L entering the optical waveguide device 110. Nonetheless, the present embodiment is merely an implementation of the optical masking layer 170 instead of a limitation to the invention.

Figure 6:
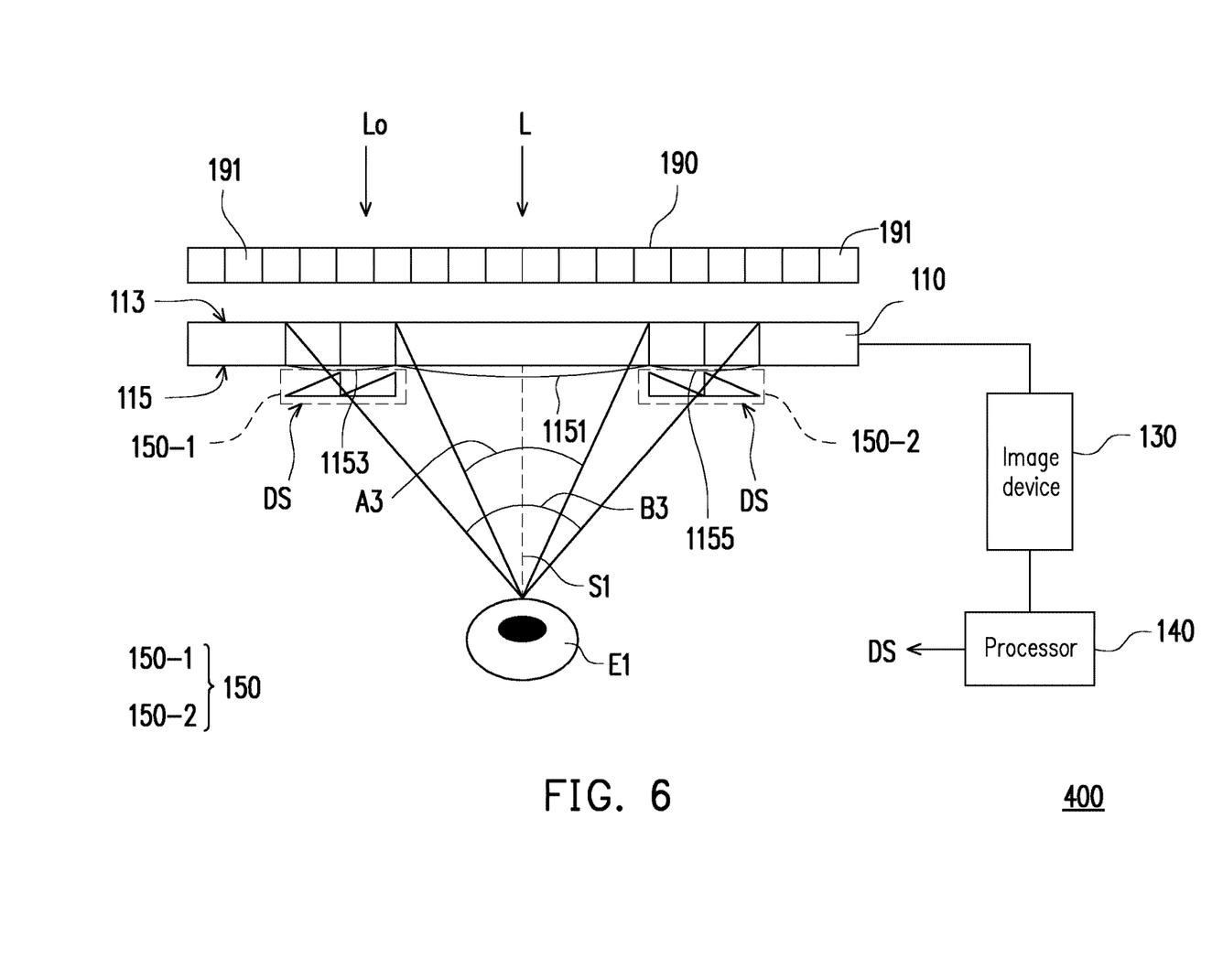
FIG. 6 is a schematic diagram illustrating a head mounted display device in yet another embodiment of the invention.

With reference to FIG. 6, FIG. 6 is a schematic diagram illustrating a head mounted display device in yet another embodiment of the invention. A head mounted display device 400 of the present embodiment and the head mounted display device 100 in the embodiment shown by FIG. 1 have similar structures and have identical functions and effects. A difference between the present embodiment and the embodiment shown by FIG. 1 is that, the head mounted display device 400 further includes a optical compensation layer 190, and the optical compensation layer 190 is located on a transmission path of the environment light L. The optical compensation layer 190 receives an external object image L0 and projects the external object image L0 towards the projection target E1, so as to increase a viewing angle of the head mounted display device 400 for the external object image L0.

Specifically, the environment light L enters the optical waveguide device 110 through a light input surface 113. The environment light L includes a near-eye environment light (not shown) close to the projection target E1 and an edge environment light (not shown) away from the projection target E1. The near-eye environment light is a portion of the environment light L entering from a near-eye zone 1131 of the light input surface 113, and the edge environment light is a portion of the environment light L entering from edge zones 1133 and 1135 of the light input surface 113. When the optical compensation layer 190 is inactive, due to influences from devices in the head mounted display device 400, only the near-eye environment light entering from the ear-eye zone 1131 can be transmitted to the projection target E1, whereas the edge environment light entering from the edge zones 1133 and 1135 cannot be transmitted to the projection target E1. At the time, a viewing angle of the projection target E1 for viewing the environment light L is a viewing angle A3.

When the optical compensation layer 190 is active, the near-eye environment light is transmitted to the projection target E1 after penetrating the optical compensation layer 190. The optical compensation layer 190 deflects the edge environment light towards the projection target E1 so that the edge environment light entering from the edge zones 1133 and 1135 can be transmitted to the projection target E1. Accordingly, the viewing angle of the projection target E1 for viewing the environment light L may be increased to a viewing angle B3. Accordingly, with the optical compensation layer 190 in the active state according to the present embodiment, the edge environment light—which cannot be transmitted to the projection target E1 originally—can be deflected towards the projection target E1 and transmitted to the projection target E1 so as to increase the viewing angle for the environment light L. The external object image L0 is, for example, an image of one object in the environment light L, and the optical compensation layer 190 may increase the viewing angle of the head mounted display device 400 for the external object image L0.

In addition, an angle of the portion of the environment light L deflected towards the projection target E1 by the optical compensation layer 190 is, for example, between 0° and 10°, but the invention is not limited thereto.

The invention is not intended to limit an implementation of the optical compensation layer 190 so long as it is a structure capable of deflecting the edge environment light towards the projection target E1. One implementation of the optical compensation layer 190 may be: the optical compensation layer 190 including a liquid crystal layer (not shown) and a driver (not shown). The driver provides a driving voltage according to the command signal DS to adjust the liquid crystal layer so that the portion of the environment light L is reflected by the liquid crystal layer to be deflected towards the projection target E1. Functions and principles of aforesaid implementation are similar to the optical conversion layer 150a shown by FIG. 2, which is not repeated hereinafter.

Another implementation of the optical compensation layer 190 may be: the optical compensation layer 190 including at least one prism (not shown) and an actuator (not shown), where the actuator is coupled to the prism. The actuator receives the command signal DS and adjusts a rotation angle of the prism according to the command signal DS so that the portion of the environment light L is reflected by the prism to be deflected towards the projection target E1. Functions and principles of aforesaid implementation are similar to the optical conversion layer 150b shown by FIG. 3, which is not repeated hereinafter.

Figure 7:
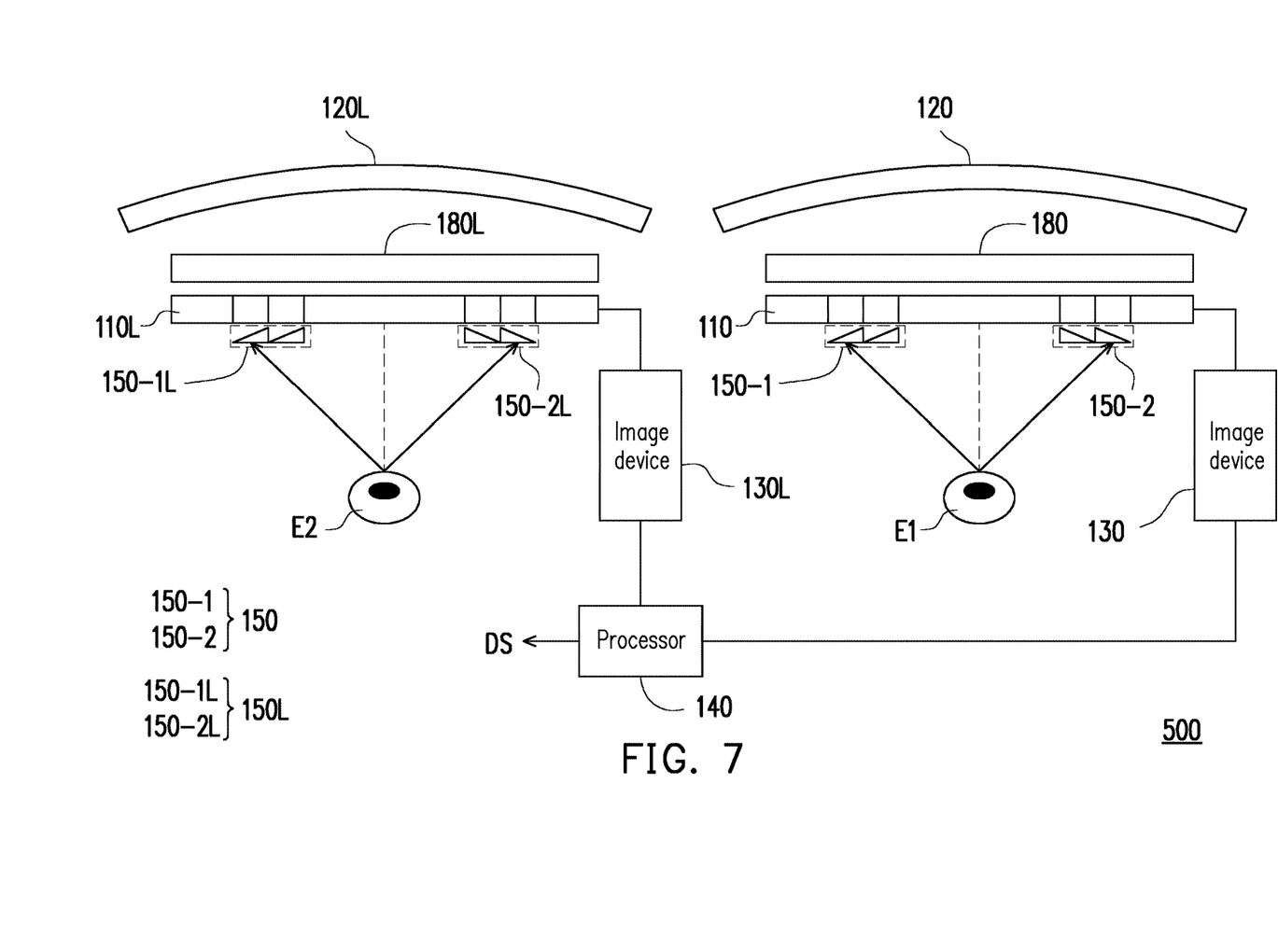
FIG. 7 is a schematic diagram illustrating a head mounted display device in yet another embodiment of the invention.

With reference to FIG. 7, FIG. 7 is a schematic diagram illustrating a head mounted display device in yet another embodiment of the invention. A head mounted display device 500 includes optical waveguide devices 110 and 110L, transparent devices 120 and 120L, image devices 130 and 130L, a processor 140, optical conversion layers 150 and 150L and optical layers 180 and 180L. The optical conversion layer 150 includes conversion layer 150-1 and 150-2, and the optical conversion layer 150L includes conversion layers 150-1L and 150-2L. Projection targets E1 and E2 may be two eyeballs of the user, and the processor 140 is coupled to the image devices 130 and 130L. The optical waveguide device 110, the image device 130 and the optical conversion layer 150 can project a projection image (not shown) onto a projection target E1. The optical waveguide device 110L, the image device 130L and the optical conversion layer 150L may project a projection image (not shown) onto a projection target E2. Accordingly, the purpose of increasing the viewing angle of an augmented reality image may be achieved. Here, functions and effects of the optical waveguide devices 110 and 110L, the image devices 130 and 130L and the optical conversion layers 150 and 150L are identical to those of the head mounted display device 100 shown by FIG. 1, which are not repeated hereinafter.

The optical layers 180 and 180L may be the optical masking layer in the embodiment shown by FIG. 5 or the optical masking layer in the embodiment shown by FIG. 6, or may be a combination of the optical masking layer and the optical compensation layer, which are not particularly limited by the invention. The transparent devices 120 and 120L may be light-transmittable optical elements disposed in front of the optical waveguide devices 110 and 110L, respectively. A material of the transparent devices 120 and 120L may be, for example, at least one of glass or plastic, but the invention is not limited thereto. The transparent devices 120 and 120L may also be other suitable transparent substances.

Figure 8:
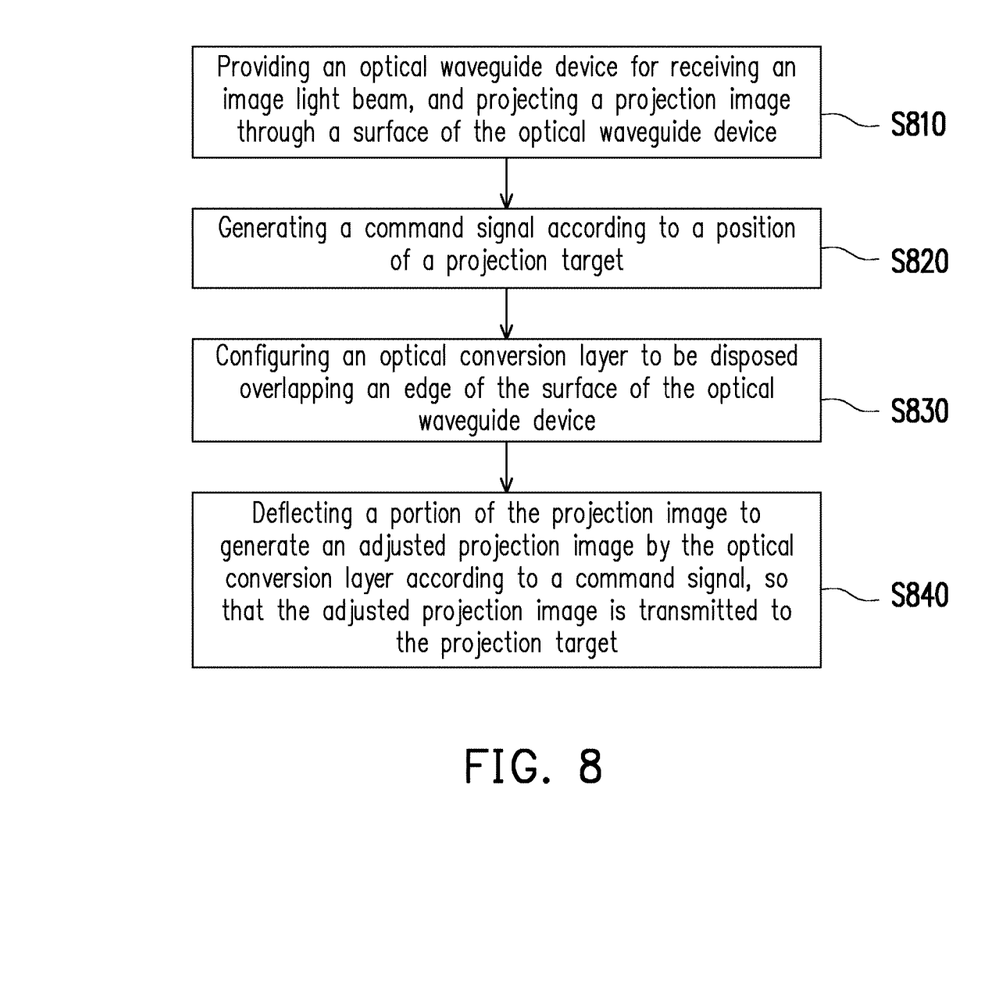
FIG. 8 is a flowchart illustrating an image projection method in an embodiment of the invention.

With reference to FIG. 8, FIG. 8 illustrates a flowchart of an image projection method according to the embodiments of the invention. The image projection method includes the following steps. In step S810, an optical waveguide device is provided to receive an image light beam, and a projection image is projected through a surface. Next, in step S820, a command signal is generated according to a position of a projection target. In step S830, an optical conversion layer is configured to be disposed overlapping an edge of the surface. In step S840, a portion of the projection image is deflected by the optical conversion layer to generate an adjusted projection image according to a command signal, so that the adjusted projection image is transmitted to the projection target.

Implementation details regarding the steps above have been described in the previous embodiments and implementations, which are not repeated hereinafter.

In summary, according to the head mounted display device and the image projection method described in the embodiments of the invention, the optical conversion layer is disposed on the optical waveguide device so that the edge projection image—which cannot be transmitted to the projection target originally—can be deflected towards the projection target and transmitted to the projection target. As a result, the purpose of increasing the viewing angle of the head mounted display device may be achieved to provide the realistic and immersive sensation for users.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A head mounted display device, comprising:
an optical waveguide device, receiving an image light beam, and projecting a projection image through a surface of the optical waveguide device;
an image device, used to provide the image light beam;
an optical conversion layer, disposed overlapping an edge of the surface of the optical waveguide device, the optical conversion layer deflecting a portion of the projection image to generate an adjusted projection image according to a command signal, so that the adjusted projection image is transmitted to a projection target; and
a processor, coupled to the optical conversion layer, and generating the command signal according to a position of the projection target.

2. The head mounted display device according to claim 1, wherein the optical conversion layer comprises:
- at least one prism, disposed overlapping an edge of the surface of the optical conversion layer; and
- an actuator, coupled to the at least one prism, and receiving the command signal for adjusting a rotation angle of the at least one prism according to the command signal.

3. The head mounted display device according to claim 1, wherein the optical conversion layer comprises:
- a liquid crystal layer, disposed overlapping an edge of the surface of the optical conversion layer; and
- a driver, coupled to the liquid crystal layer, and providing a driving voltage according to the command signal to adjust the liquid crystal layer.

4. The head mounted display device according to claim 1, further comprising:
- a projection target detector, coupled to the processor, and generating a detection result by detecting the position of the projection target,
- wherein the processor receives the detection result to generate the command signal.

5. The head mounted display device according to claim 4, wherein the projection target detector is an eyeball visual line detector.

6. The head mounted display device according to claim 1, wherein after entering the optical waveguide device, an environment light penetrates the optical conversion layer to be transmitted to the projection target.

7. The head mounted display device according to claim 6, further comprising:
- an optical masking layer, the optical masking layer being located on a transmission path of the environment light, the optical masking layer comprising a plurality of light masking members, the processor controlling the optical masking layer so that a portion of the environment light entering the optical waveguide device is blocked by the light masking members.

8. The head mounted display device according to claim 7, wherein each of the light masking members comprises a liquid crystal layer, and the processor controls the liquid crystal layer to block the portion of the environment light entering the light masking member.

9. The head mounted display device according to claim 6, further comprising: an optical compensation layer, disposed on a transmission path of the environment light, the optical compensation layer receiving an external object image, so that the external object image is projected onto the projection target.

10. The head mounted display device according to claim 1, wherein the optical waveguide device is at least one of a scattering waveguide element, a holographic waveguide element, a polarizing waveguide element or a reflective waveguide element.

11. An image projection method, comprising:
- providing an optical waveguide device for receiving an image light beam, and projecting a projection image through a surface of the optical waveguide device;
- generating a command signal according to a position of a projection target; and
- configuring an optical conversion layer to be disposed overlapping an edge of the surface of the optical waveguide device, and deflecting a portion of the projection image to generate an adjusted projection image by the optical conversion layer according to the command signal, so that the adjusted projection image is transmitted to the projection target.

12. The image projection method according to claim 11, further comprising:
- providing a projection target detector for generating a detection result by detecting the position of the projection target; and
- generating the command signal according to the detection result.

13. The image projection method according to claim 11, further comprising:
- providing an optical masking layer to be disposed on a transmission path of the environment light, so that a portion of the environment light entering the optical waveguide device is blocked by the optical masking layer.

14. The image projection method according to claim 11, further comprising:
- providing an optical compensation layer to be disposed on a transmission path of the environment light, and receiving an external object image by the optical compensation layer, so that the external object image is projected onto the projection target.

* * * * *